United States Patent [19]
Kihlken et al.

[11] Patent Number: 4,973,238
[45] Date of Patent: Nov. 27, 1990

[54] APPARATUS FOR MANUFACTURING AN ELECTRICAL CABLE

[75] Inventors: Dave J. T. Kihlken, Richmond, Ind.; John J. Deeter, Batavia, Ill.; Harry Nelson, Richmond, Ind.

[73] Assignee: Cooper Industries, Inc., Houston, Tex.

[21] Appl. No.: 446,149

[22] Filed: Dec. 5, 1989

[51] Int. Cl.[5] ........................ B29C 47/02; B29C 45/76
[52] U.S. Cl. .................................... 425/105; 425/113; 425/122; 425/123; 425/135; 425/171; 264/40.2
[58] Field of Search ................. 425/90, 135, 113, 114, 425/122, 123, 171, 105; 264/40.1, 402

[56] References Cited

U.S. PATENT DOCUMENTS

| | | | |
|---|---|---|---|
| 1,906,820 | 5/1933 | Shaw | 324/226 |
| 1,944,954 | 1/1934 | Sperry | 175/183 |
| 2,001,491 | 5/1935 | Hendey | 425/114 |
| 2,204,782 | 6/1940 | Wermine | 425/114 |
| 3,180,910 | 4/1965 | Buhman | 425/90 |
| 3,387,330 | 6/1968 | Lemelson | 425/114 |
| 3,437,917 | 4/1969 | Gunkel et al. | 324/37 |
| 3,461,499 | 8/1969 | Nevin et al. | 425/113 |
| 3,520,023 | 7/1970 | Verges et al. | 425/113 |
| 3,673,493 | 6/1972 | Hoffman et al. | 324/37 |
| 3,906,357 | 9/1975 | Runshang | 324/37 |
| 4,017,228 | 4/1977 | Cereijo et al. | 425/113 |
| 4,365,198 | 12/1982 | Toth | 324/226 |
| 4,543,448 | 9/1985 | Deurloo | 174/112 |
| 4,659,424 | 4/1987 | Baxter et al. | 425/135 |
| 4,663,098 | 5/1987 | Gilliam et al. | 425/114 |
| 4,767,891 | 8/1988 | Biegon et al. | 174/34 |
| 4,837,405 | 6/1989 | Bonjour et al. | 174/36 |

FOREIGN PATENT DOCUMENTS

| | | |
|---|---|---|
| 1808801 | 11/1968 | United Kingdom . |
| 1432548 | 4/1976 | United Kingdom . |

*Primary Examiner*—Willard Hoag
*Attorney, Agent, or Firm*—Fitch, Even, Tabin & Flannery

[57] ABSTRACT

Apparatus for applying marking to the outside surface of an outer jacket of a cable assembly including a cable having flat cable sections and sections where the conductors are not held. The apparatus includes a supply station for providing a length of the cable, a take up station for taking up the completed cable assembly, and a driver for moving the cable toward the take up station. The apparatus also includes a flat cable section detector adjacent the supply station for marking a flat cable section with an implant, and an extruder positioned downstream of the flat cable section detector for providing the outer jacket about the cable and the implant. The apparatus further includes an implant detector disposed downstream of the extruder for detecting the passage of the implant, and a printer located between the implant detector and the take up station and which is responsive to the implant detector for marking the location of a flat cable section on the outside surface of the outer jacket.

8 Claims, 6 Drawing Sheets

APPARATUS FOR MANUFACTURING AN ELECTRICAL CABLE

This invention relates to electrical wiring components and, more specifically, to an electrical cable having spaced sections which can be formed into a flat configuration for termination by a mass termination, insulation displacement connector.

BACKGROUND OF THE INVENTION

Mass termination, insulation displacement connectors have come into increasing commercial prominence because of the significant savings in time and labor they offer compared to stripping and individually terminating each conductor using a crimp terminal. These connectors have an insulative housing body holding a number of regularly spaced terminal elements having slotted plates terminating in sharpened free ends extending beyond a surface of the body. The connectors also include covers having recesses in a facing surface for receiving the free ends of the plates. After the insulated conductors are aligned with their corresponding slotted plates, relative closing of the housing body and cover results in displacement of the insulation with the conductor cores contacting the metallic plates. For further information regarding the operation and structure of such mass termination connectors, reference may be made to U.S. Pat. Nos. 4,458,967 and 3,912,354.

The most efficient form of conductors for use with such connectors is the flat cable in which conductors, running parallel and spaced to match the spacing of the terminal elements in the connector, are held by a layer of insulation. The use of a flat cable avoids running the conductors one at a time and holding them in position for termination. The flat cable can be used for either a daisy chain connection (where the connector is applied intermediate the cable ends) or an end connection. The sharpened ends of the slotted plates pierce the web material between the conductors in the flat cable as the body and cover close so slitting of the cable between conductors is not required.

While flat cables offer many advantages with respect to efficiency in termination, they present difficulties during routing. Flat cables have certain dimensions larger than comparable round cables, the flat cables do not bend as easily, they are more susceptible to damage during routing, and the continuous presence of the layer of insulation holding the discrete conductors may result in somewhat increased weight of a flat cable.

An electrical cable has been proposed including alternating flat cable and twisted pair sections with an outer jacket holding the cable so that it has a generally circular cross section to provide flexibility superior to that of a flat cable. The provision of the twisted pair sections reduce cross talk among conductors. This cable carries spaced indicia to mark the location of the flat cable sections to limit the extent that the outer jacket need be removed to prepare a flat cable section for termination. However, in the event of significant slippage between the outer jacket and the conductors, the markings could move out of alignment with the flat cable sections. For further information concerning the structure and operation of this cable, reference may be made to commonly-assigned U.S. Pat. No. 4,767,891.

U.S. Pat. No. 4,543,448 to Deurloo for ELECTRICAL CORD teaches a magnetically identifiable conductor, for use in a cord set. The cord set has insulated conductors, each having a conductive core. A conductive core 23, in addition to copper wires, has a single steel wire strand in order to identify it as a ground lead. The cable is rotated until the ground lead having the high magnetic permeability conductor therein is brought into proximity with a detector. Once it is detected, suitable connectors may be affixed to it and the manufacturer will know that connection has been made to the ground lead at both of its ends.

U.S. Pat. No. 1,906,820 to Shaw for MAGNETIC DETECTOR is directed to an apparatus for detecting small magnetic particulates in the insulating jacket of an electrical cable during manufacture. A magnetic detector is placed in proximity with the cable and controls a cable feeding mechanism. The system interrupts manufacture of the cable in the event that a steel bristle becomes entangled therein.

U.S. Pat. No. 1,944,954 for a FLAW DETECTOR FOR ELECTRICAL CONDUCTORS discloses a method of detecting flaws in an electrical cable when current is passed through it by sensing the magnetic field formed around the cable. Thus, the cable must be energized.

British Patent Specification No. 1,432,548 is directed to a method of printing indicia on a cable after which the cable is covered with a transparent sheath.

SUMMARY OF THE INVENTION

Among the various aspects and features of the present invention may be noted the provision of an improved electrical cable having flat cable sections and twisted pair sections. The cable includes markings indicating the presence of flat cable portions so that only a limited amount of the outer jacket need be removed to expose the flat cable section to be terminated. These markings are accurately applied because the precise position of a flat cable section is detected after the outer jacket is extruded about the conductor. More specifically, prior to application of the outer jacket, ferromagnetic implants are brought together with the cable which mark the location of flat cable sections. After application of the outer jacket, the presence of the implants is detected using a ferromagnetic detector which controls marking of the location of the flat cable section on the outside surface of the jacket. The cable of the present invention and the apparatus for manufacturing the cable are reliable in use, have long service life, and are relatively economical and easy to manufacture. Other aspects and features of the present invention will be, in part, apparent and, in part, will be pointed out in the following specification and accompanying drawings.

Briefly, apparatus for applying marking to the outside surface of an outer jacket of a cable assembly, of the type including a cable having a plurality of first sections and a plurality of second sections with one of the second sections spacing adjacent ones of the first sections, to indicate location of at least some of the second sections beneath the outer jacket, includes a supply station for a length of cable. The apparatus also includes a take up station for the cable assembly positioned downstream of the supply station, and means for moving the cable assembly toward the take up station. The apparatus further includes a detector for locating a second section and installing an implant at a predetermined distance from this second section. An extruder is positioned downstream of the detector for applying the outer jacket about the cable and the implant, while an implant detector is disposed downstream of the extruder. Finally, a printer is located between the implant detector and the take up station and is responsive to the implant detector for marking the location of the second section on the outside surface of the jacket so that the cable user can expose that second section by removing only a limited portion of the outer jacket.

As a method of forming a cable of generally circular cross section including the flat cable sections and sections where the conductors are not held, the invention includes several steps:

(a) The location of a flat cable section is marked using a ferromagnetic implant.

(b) The outer jacket is extruded about the conductors and the implant.

(c) The location of the implant is detected after application of the outer jacket; and (d) Indicia are applied to the outside surface of the outer jacket in response to the detection of the implant to identify the location of the flat cable section.

BRIEF DESCRIPTION OF THE DRAWINGS

Corresponding reference characters indicate corresponding components throughout the several views of the drawings.

DESCRIPTION OF THE PREFERRED EMBODIMENT

Figures 1, 2, 3, 4, 5:
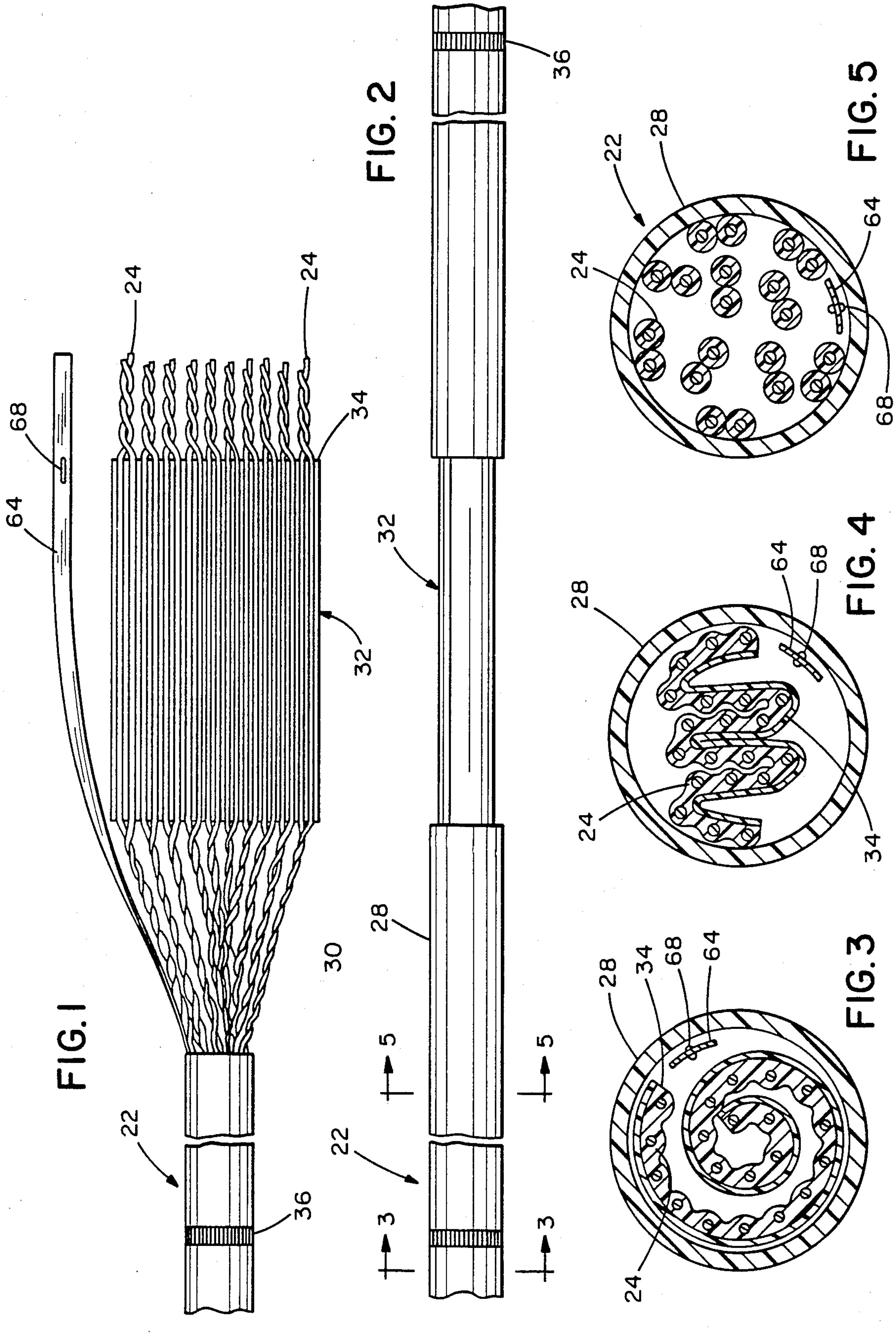
FIG. 1 is a plan view of a cable assembly embodying various features of the present invention having a cable including first or twisted pair sections and second or "flat cable" sections with the location of flat cable sections marked on the outside jacket of the cable assembly, so that a flat cable section can be located, the outer jacket removed, and the section reconfigured to a flat configuration for application of a mass termination connector.
FIG. 2 illustrates the cable assembly of FIG. 1 with a portion of the outer jacket removed and with the remainder of the cable assembly in its round configuration throughout its length.
FIG. 3 is a cross-sectional view taken generally along line 3—3 of FIG. 2 through a second cable section in which the "flat cable" is spiralled.
FIG. 4 is a cross-sectional view of an alternative embodiment of the cable of FIG. 4 wherein the flat cable section is folded instead of being spiralled.
FIG. 5 is a cross-sectional view taken generally along line 5—5 of FIG. 2 through a first cable section.
Figure 6:
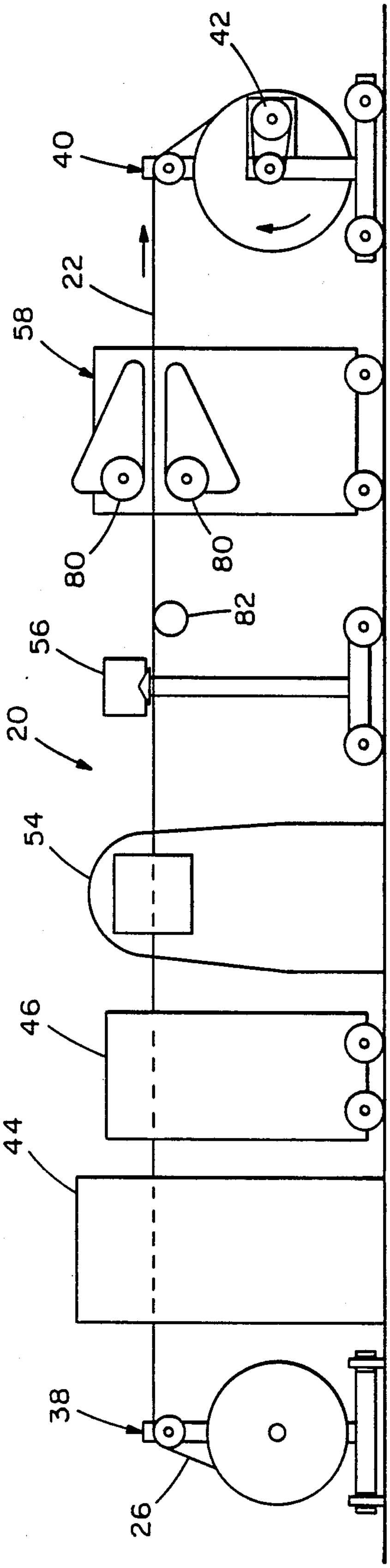
FIG. 6 is a simplified diagrammatic representation of the components of a production line for manufacturing the cable assembly of FIG. 1 including a ferromagnetic implant station, a reconfiguration station, an implant detection station, and a printing station.

Referring now to the drawings, apparatus for applying marking to the outside surface of an outer jacket of a cable assembly is generally indicated by reference numeral 20 in FIG. 6. As best shown in FIGS. 1 and 2, the cable assembly 22 includes a number of discrete electrical conductors 24 each having a conductive core and an insulating jacket surrounding the core. The cable assembly is made up of a cable 26 and an outer insulative jacket 28 holding the cable so that the cable assembly has a generally circular cross section to provide greater flexibility than a flat cable. The cable 26 includes alternating first sections 30, where the conductors 24 are arranged in twisted pairs to reduce crosstalk, and second sections 32 which can be reconfigured into flat cable portions in which the conductors are held by a carrier film 34 in a parallel, regularly spaced array so that the conductor cores match the terminals in a mass termination, insulation displacement connector. Such a carrier film and the attachment of the conductors to the film is shown and discussed in U.S. Pat. No. 4,767,891, issued Aug. 30, 1988, the teachings of which are hereby incorporated by reference.

The cable assembly 22 includes indicia 36 on the outer surface of the outer jacket 28 to mark the locations of the flat cable sections 32. Thus the installer need only strip away a limited portion of the outer jacket 28 to expose an underlying flat cable section so that it can be reconfigured in preparation for its termination.

Figure 7:
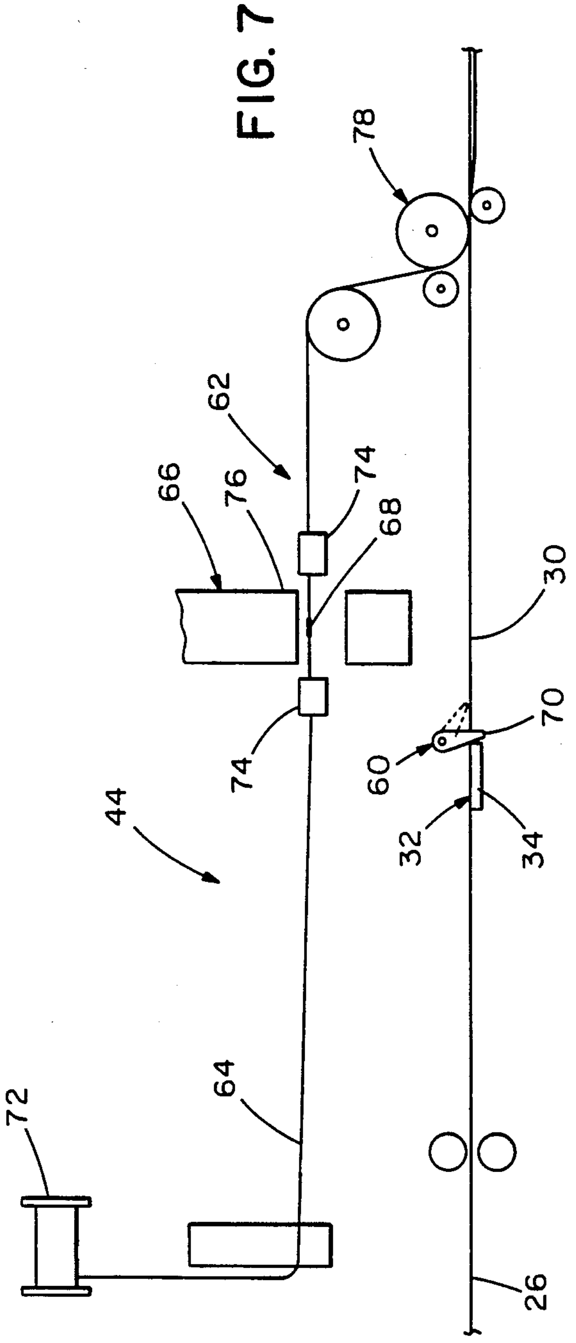
FIG. 7 is a simplified diagrammatic representation showing components of the ferromagnetic implant station.
Figure 8:
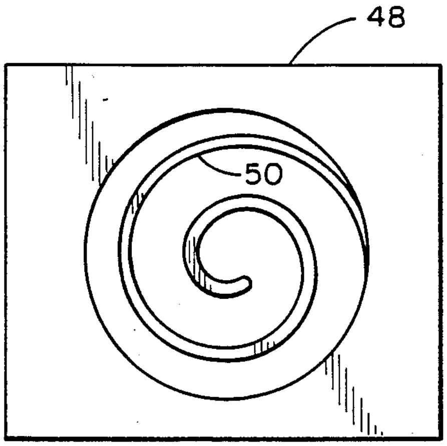
FIG. 8 shows a simplified representation of a die head at the reconfiguration station for forming the spiral cable of FIG. 3.
Figure 9:
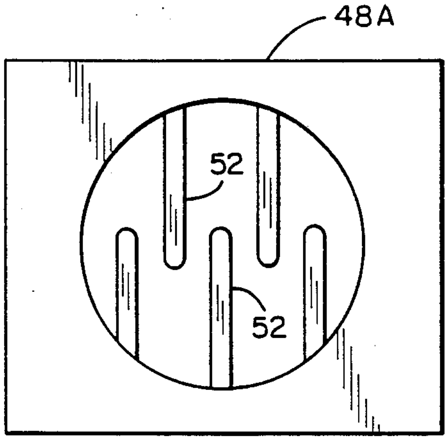
FIG. 9 shows a simplified representation of a die head at the reconfiguration station for forming the folded cable of FIG. 4.

The apparatus 20 for applying the marking 36 is shown in FIG. 6 and includes a supply station 38 for supplying a length of the cable 26 in a flat configuration, a take up station 40 positioned downstream of supply station 38 for taking up the completed cable assembly 22, and means for moving the cable toward the take up station, which could be a motor 42. The apparatus 20 also includes a station 44 for detecting a flat cable section 32 and installing an implant which can be detected after application of the outer jacket 28. The station 44 is best shown in FIG. 7. Downstream of implant station 44 is a reconfiguration station 46 in which the cable 26 is reconfigured from its flat configuration so that after application of the outer jacket 28, the cable assembly 22 has a generally circular cross section. The station 46 could include a die head 48 having a helical working surface 50 for the spiralled cable shown in FIG. 3, or the station 46 could include a die head 48A including oppositely extending, offset blades 52 for forming the folded cable of FIG. 4. Downstream of the reconfiguration station 46 is an extruder 54 for applying the outer jacket 28, followed by a detector station 56 at which the presence of an implant under the outer jacket is detected, and a printing station 58 which is responsive to the detector station 56 for applying the indicia 36. As the supply station 38, the take up station 40, the motor 42, the reconfiguration station 46, and the extruder 54 are all well know by those of skill in the art, they need not be further described here.

THE IMPLANT STATION 44

Referring to FIG. 7, the implant station 44 includes a sensor 60 positioned adjacent the pass path of the cable 26 for detecting the arrival of each flat cable section 32. Station 44 also includes a tape line 62 providing a length of tape 64 which is brought together with the cable 26 upstream of the extruder 54, and a staple application station 66 which is controlled by electrical circuitry shown in FIGS. 10A and 10B to apply a staple 68 formed of ferromagnetic material (also shown in FIG. 1) to the tape in response to detection of a flat cable section 32.

More specifically, the sensor 60 includes a deflectable sensor arm 70 which is pivotally mounted and is biased to a position intersecting the pass path of the cable 26 so that the arm extends between adjacent pairs of twisted conductors 24 in a first cable section 30. The arm is deflected to a second position, shown in phantom in FIG. 7, by the carrier film 34 of a flat cable section 32, and remains in that second position until the film advances beyond the sensor arm. The tape 64 is preferably of a non-extensible paper, while the tape line 62 includes a supply roll 72, guides 74 for maintaining the tape in alignment with a stapler head 76 at the staple application station, and a set of rollers 78 for causing the tape to merge with the cable 26 as both are advanced down the line.

Figure 10A:
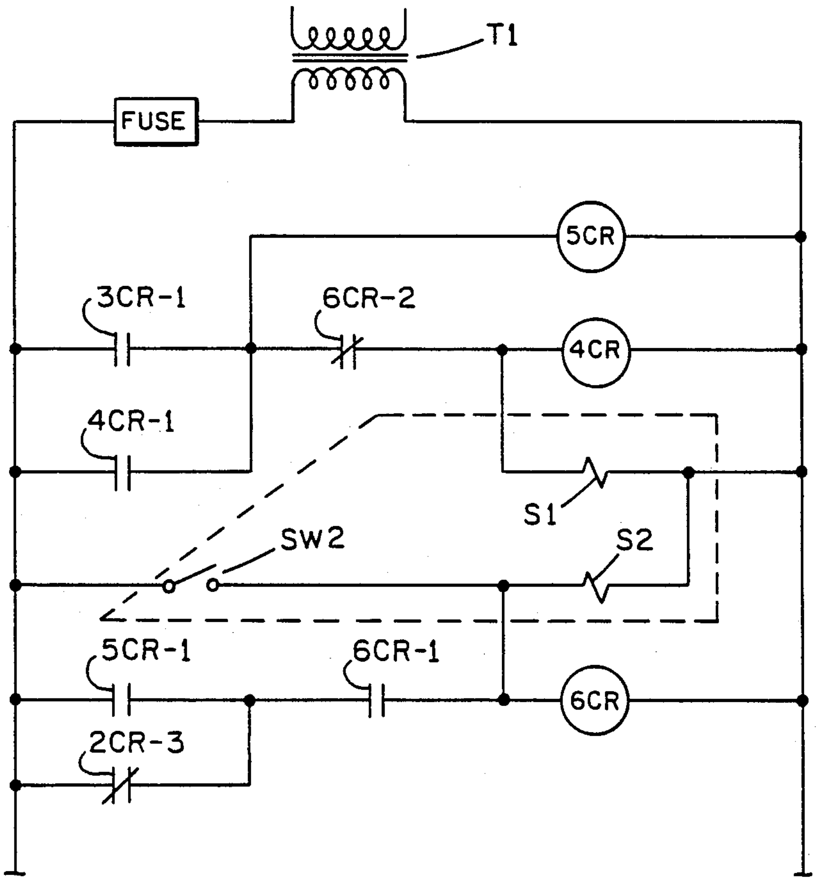
FIG. 10A and 10B are electrical schematic diagrams showing circuitry for controlling operation of a stapler at the ferromagnetic implant station.
Figure 10B:
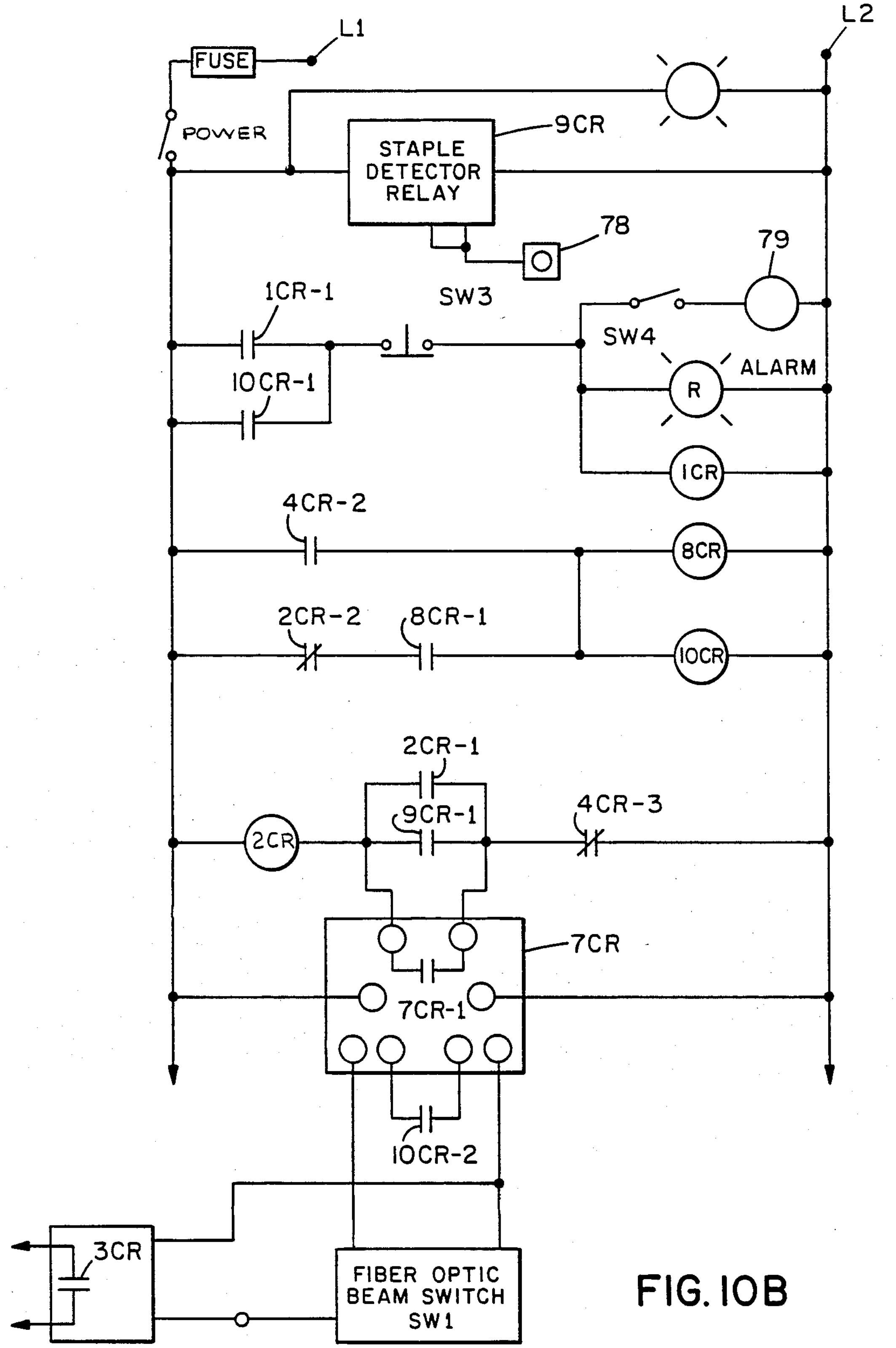

Referring to FIGS. 10A and 10B, circuitry is shown for causing operation of the stapler head 76 in response to detection of a flat cable section 32 by the sensor 60. The electrical schematic of FIG. 10A shows various circuitry connected across the output of the secondary winding of a step down transformer T1, which provides 12 volts AC. FIG. 10B shows circuitry connected across leads L1 and L2, at a nominal 120 volts AC. Operation of the circuitry is as follows. Upon a fiber optic beam switch SWI detecting that the sensor arm 70 has been deflected to its second position due to its being contacted by a carrier film 34 of a flat cable section 32, an optoisolator solid state relay 3CR causes its normally open contacts 3CR-1, shown in FIG. 10A, to close. This results in the coil of relay 5CR being energized and also the coil relay 4CR being energized which is latched on due to the closing of normally open contacts 4CR-1. Stapler head 76 down solenoid S1 is also energized causing the stapler head 76 to apply a staple 68 to the tape 64. When the stapler head moves down, a lower limit switch SW2, which is biased to an open position, is closed which energizes the coil of relay 6CR causing normally closed contacts 6CR-2 to open to deenergize down solenoid S1. With lower limit switch SW2 closed, the stapler head up solenoid S2 is energized causing the stapler head 76 to move to its up or open position where it is maintained because normally open contacts 6CR-1 are closed, and because normally open contacts 5CR-1 are closed and remain so until the flat cable section 32 passes the sensor 60 causing normally open contacts 3CR-1 to open (when the sensor arm 70 moves to its first position causing switch SWI to switch relay 3CR) resulting in deenergization of the coil of relay 5CR. When the coil of relay 6CR is energized, the coil of relay 4CR is deenergized due to the opening of normally closed contacts 6CR-2.

Referring to FIG. 10B, during the time that the coil of relay 4CR was energized, normally open contacts 4CR-2 were closed to energize the coil of relay 8CR, which latches in due to the closure of normally open contacts 8CR-1. Connected in parallel with the coil of relay 8CR is the coil of a time delay relay 10CR. The normally open contacts 10CR-1 and 10CR-2 are closed only after a predetermined time delay of about three seconds, should the coil of relay 10CR be maintained energized.

A sensor head 78, located downstream of the stapler head 76, is employed to detect that a staple 68 has indeed been applied to the tape 64. If the staple has been placed, a staple detector relay 9CR closes normally open contacts 9CR-1 which causes energization of the coil of relay 2CR, provided that the stapler head 76 has moved to its down position causing relay 6CR to deenergize relay 4CR thus allowing normally closed contacts 4CR-3 to enable energization of the coil of relay 2CR. With relay 2CR energized, normally closed contacts 2CR-2 open to drop out the coils of relays 8CR and 10CR to preclude an alarm indicating that no staple has been applied. Furthermore, with the coil of relay 2CR energized, normally closed contacts 2CR-3 open in the circuitry of FIG. 10A, which (assuming that the film 34 of the flat cable section has passed, allowing the sensor arm 70 to return to its first position resulting in relay 3CR opening contacts 3CR-1 to deenergize the coil of relay 5CR) causes the deenergization of coil 6CR and the attendant closing of contacts 6CR-2 thereby permitting the stapler head to be enabled for another cycle of operation upon the detection of the next second or flat cable section 32.

In the event that the sensor head 78 does not determine that a staple has been applied to the tape, the time delay relay 10CR times out which causes closing of normally open contacts 10CR-1 and 10CR-2. The closure of contacts 10CR-1 cause energization of the coil of relay ICR which is sealed in due to closure of normally open contacts ICR-1. This causes energization of an alarm which may include a lamp and also an audible indicator 79, if switch SW4 is closed. The closure of normally open contacts 10CR-2 causes a one shot 7CR to close normally open contacts 7CR-1 which also causes energization of the coil of relay 2CR. As mentioned above, the energization of the coil of 2CR functions to place the stapler head in condition to again apply a staple upon detection by sensor 60 of the next carrier film of a flat cable section. The purpose of the one shot 7CR is to maintain the coil of relay 2CR energized sufficiently long to avoid a race condition with relays 8CR and 10CR. The operator can turn off the alarm indication by operating normally closed reset switch SW3, which drops out the coil of relay 1CR.

The sensor head 78, the staple detector relay 9CR, and the one shot 7CR could be part numbers TH-315, TA-340 and CV-21T, respectively, available from the Keyence Corp. of America, of Torance, Calif.

THE DETECTOR STATION 56

Figure 11:
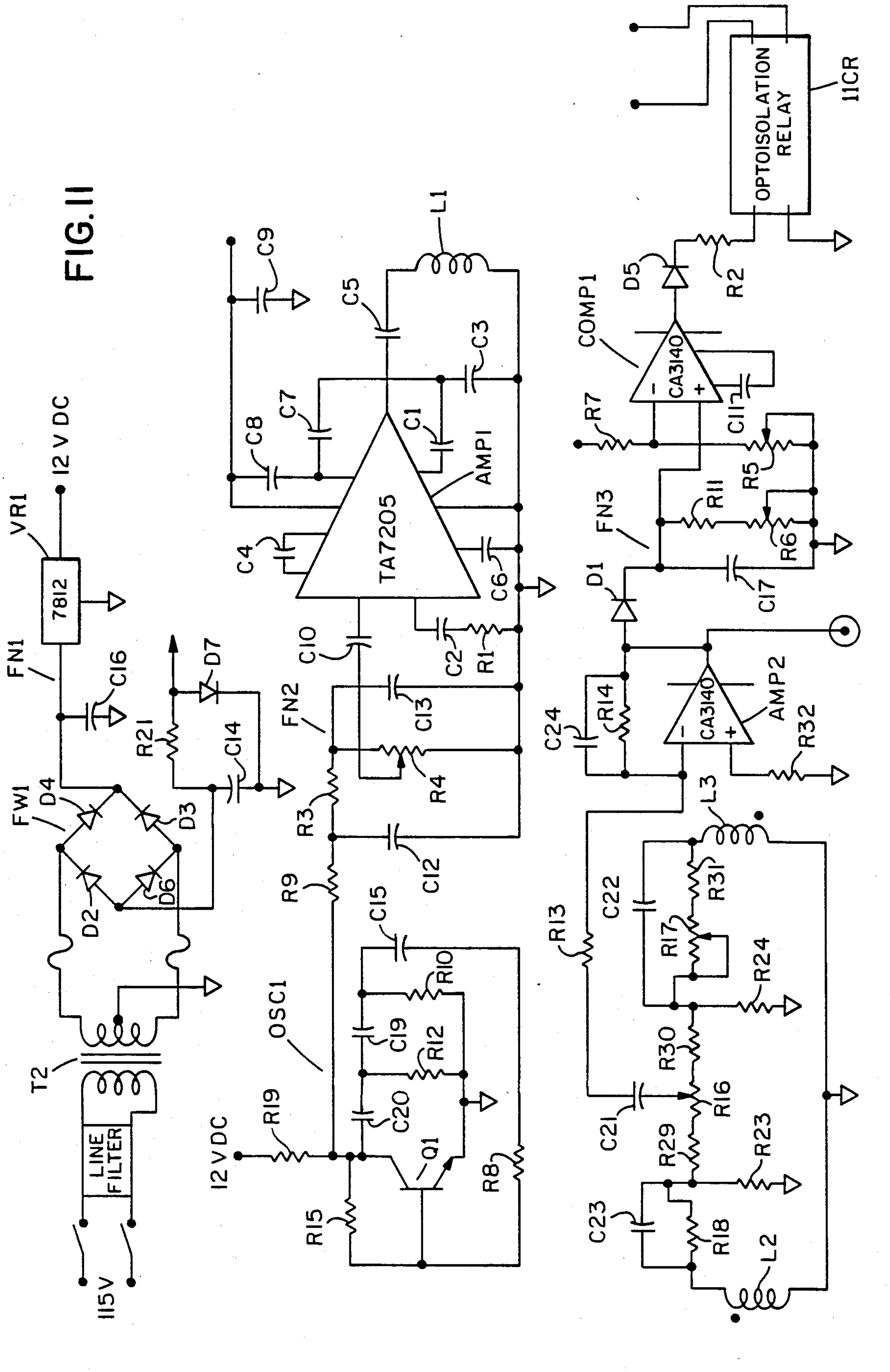
FIG. 11 is an electrical schematic diagram of a ferromagnetic sensor and supporting circuitry at the implant detection station.

The circuitry for the detector station 56 is shown in the electrical schematic diagram of FIG. 11, the top portion of which shows a power supply, the middle portion depicting a waveform generator, and the lower portion illustrating a ferromagnetic detector for sensing the presence of a steel staple 68 beneath the outer jacket 28 and, in response thereto, triggering an optoisolator relay 11CR to close a set of a set of normally open contacts 11CR-1.

The heart of the ferromagnetic detector includes a three coil network made up of a center excitation coil L1, an upstream sensor coil L2 and a downstream sensor coil L3 wound in the opposite sense with respect to coil L2. The coils are preferably concentric, disposed in series and with the cable assembly 22 passing through the centers of the coils. The coils L2 and L3 are connected in a summing circuit so that with no ferromagnetic material present to change the permeability of the magnetic circuit of either L2 or L3, a null output of the summing circuit is achieved. However, when a staple passes through coil L2, the permeability of the magnetic circuit of L2 is lowered, providing an output for the summing circuit.

More specifically, the power supply which is connected to the leads of a nominal 120 AC line, includes a step down transformer T2, the output of the secondary of which is rectified by a full wave bridge rectifier FWl. The positive output of the full wave bridge rectifier is connected to a filter network FNI and the output of the filter network serves as the input to an active voltage regulator VRI for providing a relatively ripple free 12 volt dc output. The negative output of FWI is connected to a network including a zener diode to regulate the voltage to the operational amplifiers discussed below.

The waveform generator includes an oscillator OSCI connected to the output of the voltage regulator VR. The oscillator provides an output at about 1.2 KHz and is coupled to a low pass frequency filter FN2 through a coupling resistor R9. The filter network FN2 is coupled by a coupling capacitor C10 to an audio power amplifier AMPI, the output of which is coupled by a coupling capacitor C5 to the excitation coil L1.

Referring to the lower portion of the schematic, one end of coil L2 is connected to ground through a voltage divider including resistors R18 and R23, while one end of coil L3 is connected to ground through a voltage divider including an adjustment resistor R17 and R24. The midpoints of the two voltage dividers are connected by a potentiometer R16, which together with the voltage divider forms a summing network. By appropriate adjustment of R16 and R17, a null output of the potentiometer R!6 can be achieved when no ferromagnetic material is present within the coils. However, upon a staple entering into the coil L2, the balance is upset causing a signal to be provided at the output of potentiometer R16 which is connected to the inverting input of an operational amplifier AMP2, through a resistor R13. The output of amplifier AMP2 passes through a rectifier diode D1 and a filter network FN3 to provide a DC level, corresponding to the change in permeability of the magnetic circuit of L2 due to the presence of the staple, to the non-inverting input of a comparator COMPl. The inverting input is connected to the midpoint of voltage divider including potentiometer R5 and resistor R7. Upon the comparator detecting a sufficiently large signal at its non-inverting input, it provides an output which triggers operation of the optoisolator ODC 15, providing a switching output to indicate detection of a staple 68.

THE PRINTING STATION 58 AND DETECTOR TO PRINTER INTERFACE

Figure 12:
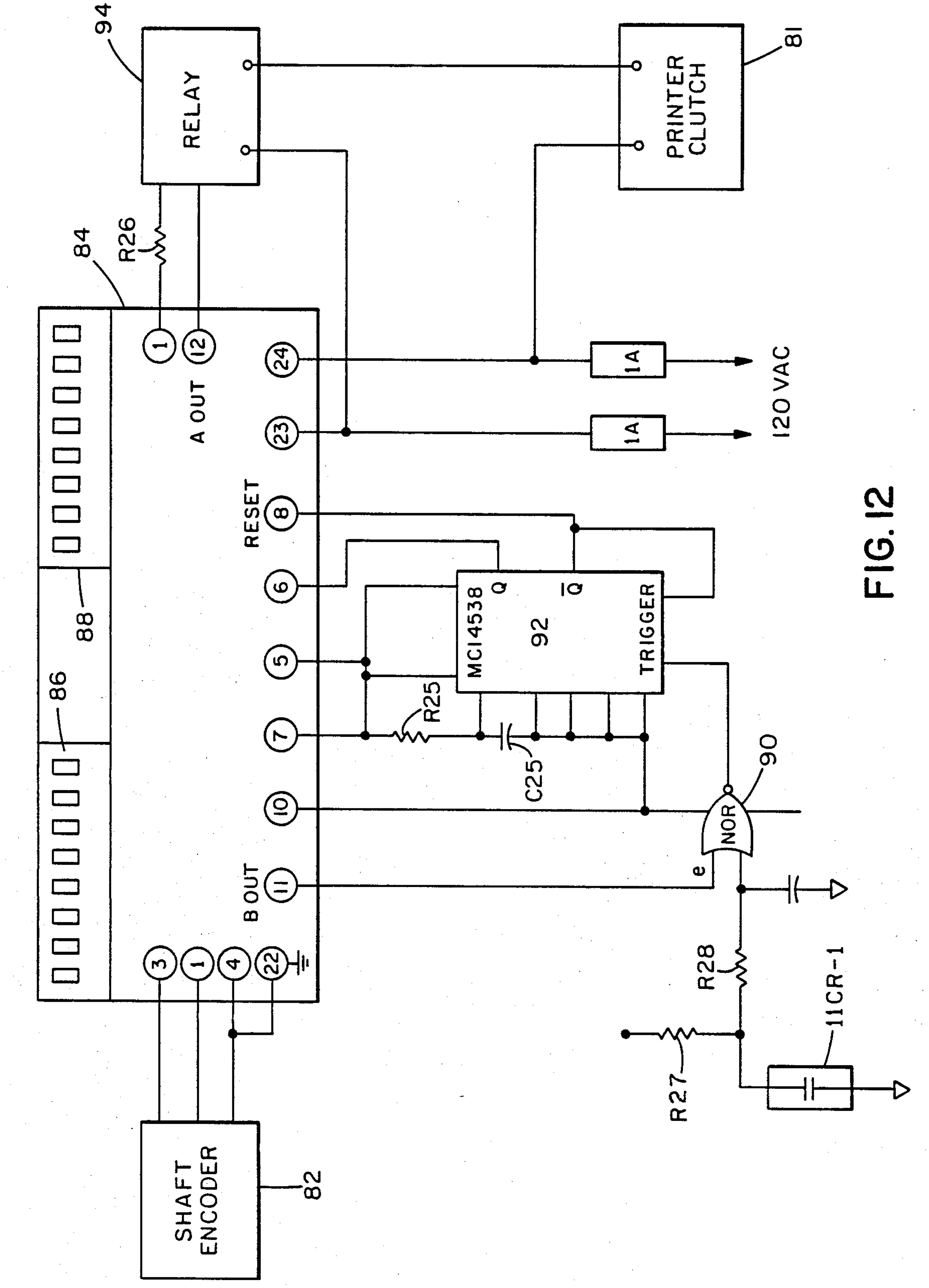
FIG. 12 is an electrical schematic diagram of circuitry interfacing the implant detection station and the printing station.

Referring to FIGS. 6 and 12, the printing station 58 includes a conventional printer including print wheels 80 for applying the indicia 36, a motor for rotating the print wheels at the speed of the cable assembly 22, and a printer clutch 81 for selectively coupling the print wheels to the printer motor.

The detector to printer interface, which operates to delay application of the marking of the cable assembly until the detected flat cable section has moved to the printing station, includes an incremental shaft encoder 82 including a wheel that contacts the cable. That wheel may have a circumference of one foot and the encoder could provide 600 pulses per rotation, resulting in 600 pulses per foot of travel of the cable assembly. The interface also includes a counter control 84 which could be a Series-1900 Count/Control manufactured by Durant Digital Instruments of Watertown, Wisc.

The counter control has a first thumbwheel switch 86 which is associated with the A output of the counter control. This switch is set to a number corresponding to the distance, measured in shaft encoder pulses, between the detector station 56 and the printing station 58. Thus if the working components of the stations are separated by two feet, the switch 86 is set to 1200. The counter control has a second thumbwheel switch 88 which could be employed to control an enable or B output. This enable output could be used if the lengths of the first or twisted pair cable sections are less than the distance between stations 56 and 58. More specifically, if the flat cable sections are close together, the second switch 88 could be set to a number slightly greater than 1200, e.g., 1250, to ensure that the counter control 84 is not reset before it times out, causing provision of a signal at the A output.

The interface also includes a NOR gate 90, one input of which is connected to ground through the normally open contacts 11CR-1 of relay 11CR, with the other input of gate 90 connected to the enable or B output of the counter control 84. The output of the gate 90 is connected to the trigger input of a one shot multivibrator 92, the output of which provides a reset signal to the counter control 84. The A output of the control 84 is connected to trigger a relay 94, which in turn energizes the printer clutch 81 to couple the printer motor to the print wheels 80.

Operation of the interface circuitry shown in FIG. 12 is as follows. Assuming that the B output is providing its low level active signal to enable NOR gate 90, upon the optoisolator 11CR being triggered by the implant detector station, the optoisolator IICR provides its switching output resulting in a low active level being supplied to the other input of NOR gate 90. This results in the NOR gate providing a high output which triggers the multivibrator 92. When this occurs, the multivibrator provides a signal at its $\overline{Q}$ output causing the counter control 84 to reset. This causes the counter to start counting from zero up to the 1200 number associated with the first thumbwheel switch 86, counting out of which causes a signal at the A output, as well as counting down of the number on the second thumbwheel switch 88 to again provide the enable signal to gate 90. Upon the counter reaching 1200, corresponding to the distance between the detector station 56 and the printing station 58, the A output provides a signal triggering relay 94 causing the printer clutch to be energized which in turn results in application of the marking 36 to the outer jacket 28 of the cable assembly 22. Upon the count reaching 1250, the B output switches to provide its low level active enable signal to the NOR gate 90. Thus, the next time that the detector station 56 senses the passage of a steel staple 68, a switching signal from the optoisolator IICR will again result in resetting of the counter to start another cycle of operation.

The values of resistors and capacitors, and the part numbers of transistors and diodes shown in FIGS. 11 and 12 are as follows:

| Resistors: |
|---|
| R1 - 1 kilohm |
| R2 - 820 ohms |
| R3 - 75 kilohm |
| R4 - 20 kilohm |
| R5 - 10 kilohm |

-continued

| |
|---|
| R6 - 1 megohm |
| R7 - 220 kilohm |
| R8 - 2.2 kilohm |
| R9 - 24 kilohm |
| R10 - 2.2 kilohm |
| R11 - 10 kilohm |
| R12 - 2.2 kilohm |
| R13 - 7.5 kilohm |
| R14 - 12 megohm |
| R15 - 220 kilohm |
| R16 - 100 phms |
| R17 - 1 kilohm |
| R18 - 10 kilohm |
| R19 - 3.5 kilohm |
| R21 - 470 ohm |
| R23 - 10 kilohm |
| R24 - 10 kilohm |
| R25 - 100 kilohm |
| R26 - 1 kilohm |
| R27 - 15 kilohm |
| R28 - 33 kilohm |
| R29 - 430 ohm |
| R30 - 430 ohm |
| R31 - 1 kilohm |
| R32 - 7.5 kilohm |
| Capacitors: |
| C1 - 47 picofarads |
| C2 - .1 microfarad |
| C3 - .047 microfarad |
| C4 - 47 picofarads |
| C5 - 2100 microfarad |
| C6 - 220 microfarad |
| C7 - 47 microfarad |
| C8 - .047 microfarad |
| C9 - 350 microfarads |
| C10 - 3 microfarad |
| Cll - 22 picofarads |
| C12 - .01 microfarad |
| C13 - .01 microfarad |
| C14 - 470 microfarad |
| C15 - .022 microfarad |
| C16 - 2100 microfarad |
| C17 - 3 microfarads |
| C19 - .022 microfarad |
| C20 - .022 microfarad |
| C21 - .022 microfarad |
| C22 - .022 microfarad |
| C23 - .022 microfarad |
| C24 - 15 picofarads |
| C25 - .1 microfarad |
| Diodes: |
| D1 1N4006 |
| D2 1N4006 |
| D3 1N4006 |
| D4 1N4006 |
| D5 1N4006 |
| D6 1N4006 |
| D7 1N4006 |
| Transistors: |
| Q1 - 2N3904 |

As a method of forming a cable assembly 22, the present invention includes several steps:

(a) The location of a flat cable section 32 is marked by applying a ferromagnetic implant.

(b) The outer jacket 28 of the cable assembly is extruded about the conductors 24 and the implant 68.

(c) The location of the implant is detected after the application of the outer jacket; and (d) Indicia 36 is applied to the outside surface of the outer jacket in response to the detection to the implant to identify the location of the flat cable section 32.

In view of the above, it will be seen that the several objects of the invention are achieved and other advantageous results are attained.

As various changes could be made in the above constructions without departing from the scope of the invention, it is intended that all matter contained in the above descriptiön or shown in the accompanying drawings shall be interpreted as illustrative and not in a limiting sense.

What is claimed is:

1. Apparatus fc: applying marking to the outside surface of an outer jacket of a cable assembly, of the type including a cable having a plurality of first sections and a plurality of second sections with one of said second sections spacing adjacent ones of said first sections, to indicate locations of at least some of said second sections beneath said outer jacket, said apparatus comprising:

means for supplying a length of said cable;

means for taking up the completed cable assembly positioned downstream of said means for supplying;

means for moving said cable toward said means for taking up;

means for detecting at least one said second section and installing an implant at a predetermined distance from the last-mentioned second section;

an extruder positioned downstream of said means for detecting for providing said outer jacket about said cable and said implant;

implant detector means disposed downstream of said extruder for detecting the passage of said implant; and printer means located between said implant detector means and said means for taking up and responsive to said implant detector means for marking the location of the last-mentioned second section on the outside surface of said jacket whereby the cable assembly user can expose that second section by removing only a limited portion of said outer jacket.

2. Apparatus as set forth in claim 1 wherein said implant is formed of ferromagnetic material, said implant detector means comprising a ferromagnetic detector including a summing circuit comprising a pair of coupled coils the permeability of the magnetic circuits of which are affected due to passage of said implant, said circuit providing an output in response to detecting said implant.

3. Apparatus as set forth in claim 2 wherein said printer means includes a print wheel for applying indicia to the outer jacket, a printer motor, a clutch for selectively coupling said wheel to said motor, and circuit means responsive to the output of said summing circuit to operate said clutch.

4. Apparatus as set forth in claim 1 wherein said cable assembly is an electrical cable assembly comprising a plurality of discrete electrical conductors, said conductors being formed in twisted pairs in said first sections and said connectors being held in regularly spaced parallel relationship by a carrier film in said second sections said apparatus including means for attaching said conductors in regularly spaced relationship to a carrier film in said second stations.

5. Apparatus as set forth in claim 4 wherein said cable is generally flat when leaving said means for supplying, said apparatus further comprising means for deforming said cable .from its flat configuration so that the cable assembly with the outer jacket applied downstream of said extruder has a generally circular cross section.

6. Apparatus as set forth in claim 4 wherein said implant is a staple formed of ferromagnetic material and said means for detecting is a magnetic detector.

7. Apparatus as set forth in claim 4 wherein said means for detecting a said second section and installing an implant comprises:

a sensor positioned adjacent the pass path of said cable for detecting the arrival of each said second section;

a tape line providing a length of tape which is brought together with said cable upstream of said extruder;

a staple application station positioned along the tape pass path a predetermined distance with respect to said sensor; and circuit means responsive to said sensor detecting a said second section to actuate said staple application station resulting in a staple being applied to said tape.

8. Apparatus as set forth in claim 7 wherein said sensor includes a deflectable sensor arm biased to a position intersecting the pass path of said cable so that said arm extends between adjacent pairs of twisted wires in said first sections, said sensor arm being moved toward a second position out of the cable pass path by the carrier film of each said second section.

* * * * *

UNITED STATES PATENT AND TRADEMARK OFFICE
CERTIFICATE OF CORRECTION

PATENT NO. : 4,973,238
DATED : November 27, 1990
INVENTOR(S) : Kihlken et al.

It is certified that error appears in the above-identified patent and that said Letters Patent is hereby corrected as shown below:

Column 5, line 30, change "SWI" to --SW1--.

Column 5, line 52, change "SWI" to --SW1--.

Column 6, line 27, change "ICR" to --1CR--.

Column 6, line 28, change "ICR-1" to --1CR-1--.

Column 7, line 9, change "FNI" to --FN1--.

Column 7, line 11, change "VRI" to --VR1--.

Column 7, line 12, change "FWI" to --FW1--.

Column 7, line 16, change "OSCI" to --OSC1--.

Column 7, line 22, change "AMPI" to --AMP1--.

Column 7, line 33, change "R!6" to --R16--.

Column 8, line 35, change "IICR" to --11CR--.

Column 8, line 56, change "IICR" to --11CR--.

Column 9, line 10, change "R16 - 100 phms" to --R16 - 100 ohms--.

UNITED STATES PATENT AND TRADEMARK OFFICE
CERTIFICATE OF CORRECTION

PATENT NO. : 4,973,238

DATED : November 27, 1990

INVENTOR(S) : Kihlken et al.

It is certified that error appears in the above-identified patent and that said Letters Patent is hereby corrected as shown below:

IN THE CLAIMS:

Column 10, line 55, change "connectors" to --conductors--.

Column 10, line 59, change "stations" to --sections--.

Column 10, line 63, before "from" delete the period.

Signed and Sealed this

Seventeenth Day of November, 1992

Attest:

DOUGLAS B. COMER

*Attesting Officer* *Acting Commissioner of Patents and Trademarks*